US010713816B2

(12) United States Patent
Hu et al.

(10) Patent No.: US 10,713,816 B2
(45) Date of Patent: Jul. 14, 2020

(54) FULLY CONVOLUTIONAL COLOR CONSTANCY WITH CONFIDENCE WEIGHTED POOLING

(71) Applicant: Microsoft Technology Licensing, LLC, Redmond, WA (US)

(72) Inventors: Yuanming Hu, Beijing (CN); Baoyuan Wang, Sammamish, WA (US); Stephen S. Lin, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

(21) Appl. No.: 15/649,950

(22) Filed: Jul. 14, 2017

(65) Prior Publication Data
US 2019/0019311 A1    Jan. 17, 2019

(51) Int. Cl.
| | | |
|---|---|---|
| *G06T 7/90* | (2017.01) | |
| *H04N 1/60* | (2006.01) | |
| *G06T 5/00* | (2006.01) | |
| *G06N 3/08* | (2006.01) | |
| *G06N 3/04* | (2006.01) | |

(52) U.S. Cl.
CPC .............. *G06T 7/90* (2017.01); *G06N 3/0454* (2013.01); *G06N 3/084* (2013.01); *G06T 5/009* (2013.01); *H04N 1/60* (2013.01); *H04N 1/603* (2013.01); *G06T 2207/20081* (2013.01); *G06T 2207/20084* (2013.01)

(58) Field of Classification Search
CPC ............. G06T 7/90; G06T 2207/20084; G06T 2207/20081
See application file for complete search history.

(56) References Cited

U.S. PATENT DOCUMENTS

| | | | | |
|---|---|---|---|---|
| 7,697,765 | B2* | 4/2010 | Matsugu | .............. G06K 9/4619 |
| | | | | 382/159 |
| 10,304,191 | B1* | 5/2019 | Mousavian | ............... G06T 7/70 |
| 2003/0215133 | A1* | 11/2003 | Gindele | .............. H04N 1/6027 |
| | | | | 382/167 |
| 2015/0100530 | A1* | 4/2015 | Mnih | .................... G06N 3/0454 |
| | | | | 706/25 |
| 2016/0098844 | A1* | 4/2016 | Shaji | ................... G06F 16/5838 |
| | | | | 382/156 |
| 2018/0089806 | A1* | 3/2018 | Bitterli | .................... G06T 5/002 |

OTHER PUBLICATIONS

Qian et al., "Deep Structured-Output Regression Learning for Computational Color Constancy," Jul. 2016, In Journal of Computing Research Repository (Year: 2016).*

(Continued)

*Primary Examiner* — John W Lee
(74) *Attorney, Agent, or Firm* — Schwegman Lundberg & Woessner, P.A.

(57) ABSTRACT

Disclosed in some examples, are methods, systems, and machine readable mediums that correct image color casts by utilizing a fully convolutional network (FCN), where the patches in an input image may differ in influence over the color constancy estimation. This influence is formulated as a confidence weight that reflects the value of a patch for inferring the illumination color. The confidence weights are integrated into a novel pooling layer where they are applied to local patch estimates in determining a global color constancy result.

11 Claims, 5 Drawing Sheets

(56) References Cited

OTHER PUBLICATIONS

Cardei, Vlad Constantin, "A Neural Network Approach to Colour Constancy", In Thesis of Simon Fraser University, Jan. 2000, 191 pages.

Fourure, et al., "Mixed Pooling Neural Networks for Color Constancy", In Proceedings of IEEE International Conference on Image Processing, Sep. 2016, 6 pages.

Moore, et al., "A VLSI Neural Network for Color Constancy", In Proceedings of the conference on Advances in neura information processing systems, vol. 3, Oct. 1, 1990, pp. 370-376.

Qian, et al., "Deep Structured-Output Regression Learning for Computational Color Constancy", In Journal of Computing Research Repository, Jul. 2016, 6 pages.

Yuzuguzel, Hidir, "Learning colour constancy using convolutional neural networks", In Thesis of Tampere University of Technology, Nov. 2015, 56 pages.

Funt, et al., "Bootstrapping Color Constancy", In Proceedings of Spie, Human Vision and Electronic Imaging IV, 421, vol. 3644, Jan. 23, 1999, 8 pages.

Banic, Nikola, "Methods for Computational Color Constancy", https://web.archive.org/web/20151003071752/https:/www.fer.unizg.hr/_download/repository/KDI%2C_Nikola_Banic.pdf, Published on: Oct. 3, 2015, 7 pages.

Lou, et al., "Color Constancy by Deep Learning", In Proceedings of 26th British Machine Vision Conference, Sep. 7, 2015, pp. 1-12.

Abadi, M., et al., "Tensor Flow: Large-Scale Machine Learning on Heterogeneous Systems", Retrieved from http://download.tensorflow.org/paper/whitepaper2015.pdf, Nov. 9, 2015, 19 Pages.

Alemi, A., et al., "Improving Inception and Image Classification in TensorFlow", Retrieved from https://ai.googleblog.com/2016/08/improving-inception-and-image.html, Aug. 31, 2016, 5 Pages.

Barnard, K., et al., "A Comparison of Computational Color Constancy Algorithms-Part-II. Experiments with Image Data", In Proceedings of IEEE Transactions on Image Processing, vol. 11, Issue 9, Sep. 9, 2002, pp. 985-996.

Barnard, K., "Improvements to Gamut Mapping Colour Constancy Algorithms", In Proceedings of European Conference on Computer Vision, Jun. 26, 2000, pp. 390-403.

Barron, J. T., "Convolutional Color Constancy", In Proceedings of IEEE International Conference on Computer Vision, 2015, pp. 379-387.

Bianco, S., et al., "Adaptive Color Constancy Using Faces", In Proceedings of IEEE Transactions on Pattern Analysis and Machine Intelligence, vol. 36 Issue 8, Aug. 2014, pp. 1505-1518.

Bianco, S., et al., "Color Constancy Using CNNs", In Proceedings of IEEE Computer Vision and Pattern Recognition Workshops, 2015, pp. 81-89.

Bianco, et al., "Color Constancy Using Faces", In Proceedings of IEEE Conference on Computer Vision and Pattern Recognition, Jun. 16, 2012, pp. 65-72.

Bianco, S., et al., "Single and Multiple Illuminant Estimation Using Convolutional Neural Networks", In Proceedings of IEEE Transactions on Image Processing, vol. 26 Issue 9, Sep. 2017, pp. 4347-4362.

Brainard, D.H., et al., "Analysis of the Retinex Theory of Color Vision", In Journal of the Optical Society of America A, vol. 3, Issue 10, Oct. 1, 1986, pp. 1651-1661.

Buchsbaum, G., "A spatial processor model for object colour perception", In Journal of the Franklin Institute, vol. 310, Issue 1, Jul. 1, 1980, pp. 1-26.

Cardei, V.C., et al., "Estimating the Scene Illumination Chromaticity by Using a Neural Network", In Journal of the Optical Society of America A, vol. 19, Issue 12, Dec. 1, 2002, pp. 2374-2386.

Chakrabarti, A., et al., "Color Constancy with Spatio-Spectral Statistics", In Proceedings of IEEE Transactions on Pattern Analysis and Machine Intelligence, vol. 34, Issue 8, Aug. 2012, pp. 1509-1519.

Cheng, D., "Effective Learning-Based Illuminant Estimation Using Simple Features", In Proceedings of IEEE Computer Vision and Pattern Recognition, 2015, pp. 1000-1008.

Cheng, D., et al., "Illuminant estimation for color constancy: why spatial-domain methods work and the role of the color distribution", In Journal of the Optical Society of America A, vol. 31, Issue 5, May 2014, pp. 1049-1058.

Deng, J., et al., "ImageNet: A Large-Scale Hierarchical Image Database", In Proceedings of IEEE Computer Vision and Pattern Recognition, Jun. 20, 2009, pp. 248-255.

Finlayson, G. D., "Color by Correlation: A Simple, Unifying Framework for Color Constancy", In Proceedings of IEEE Transactions on Pattern Analysis and Machine Intelligence, vol. 23, No. 11, Nov. 2001, pp. 1209-1221.

Finlayson, G. D., "Corrected-Moment Illuminant Estimation", In Proceedings of IEEE International Conference on Computer Vision, Dec. 1, 2013, pp. 1904-1911.

Finlayson, G.D., "Shades of Gray and Colour Constancy", The Twelfth Color Imaging Conference, vol. 2004, No. 1, Jan. 2004, 19 Pages.

Funt, B., et al., "Estimating Illumination Chromaticity via Support Vector Regression", In Proceedings of Color and Imaging Conference, vol. 2004, Issue 1, Jan. 1, 2004, 8 Pages.

Gehler, P.V., et al., "Bayesian Color Constancy Revisited", In Proceedings of Computer Vision and Pattern Recognition, Jun. 23, 2008, 8 Pages.

Gijsenij, A., et al., "Color Constancy Using Natural Image Statistics and Scene Semantics", In Proceedings of IEEE Transactions on Pattern Analysis and Machine Intelligence, vol. 33, Issue 4, Apr. 2011, pp. 687-698.

Gijsenij, A., et al., "Computational Color Constancy: Survey and Experiments", In Proceedings of IEEE Transactions on Image Processing, vol. 20 Issue 9, Sep. 1, 2011, pp. 2475-2489.

Hordley, S.D., "Scene Illuminant Estimation: Past, Present, and Future", In Proceedings of Color Research and Application, vol. 3 Issue 14, Aug. 2006, pp. 303-314.

Hu et al., "FC: Fully Convolutional Color Constancy with Confidence-weighted Pooling", In Proceedings of the IEEE Conference on Computer Vision and Pattern Recognition, 2017, pp. 4085-4094.

Iandola, et al, "Squeezenet: Alexnet-level Accuracy With 50x Fewer Parameters and < 0.5 MB Model Size", Retrieved from https://arxiv.org/pdf/1602.07360.pdf, Feb. 24, 2016, 13 Pages.

Joze, H.R.V., et al., "Exemplar-based color constancy and multiple illumination", In Proceedings of IEEE Transactions on Pattern Analysis and Machine Intelligence, vol. 36 Issue 5, May 2014, pp. 860-873.

Joze, H.R.V., et al., "The Role of Bright Pixels in Illumination Estimation", In Proceedings of Color and Imaging Conference, vol. 2012, Issue 1, Jan. 1, 2012, 6 Pages.

Kingma, D., et al., "Adam: A Method for Stochastic Optimization", In Proceedings of International Conference on Learning Representations, Dec. 22, 2014, pp. 1-15.

Krizhevsky, A., et al., "ImageNet Classification with Deep Convolutional Neural Networks", In Proceedings of Advances in Neural Information Processing Systems, vol. 25 Issue 2, Jan. 2012, pp. 1-9.

Long, J., et al., "Fully Convolutional Networks for Semantic Segmentation", In Proceedings of IEEE Computer Vision and Pattern Recognition, Jun. 7, 2015, pp. 3431-3440.

Lou, Z., et al., "Color Constancy by Deep Learning", In Proceedings of British Machine Vision Conference, Sep. 2015, pp. 1-12.

Pathak, D., et al., "Constrained Convolutional Neural Networks for Weakly Supervised Segmentation", In Proceedings of International Conference on Computer Vision, Dec. 7, 2015, pp. 1796-1804.

Pathak, D., "Fully Convolutional Multi-Class Multiple Instance Learning", In Proceedings of International Conference on Learning Representations, Dec. 22, 2014, pp. 1-4.

Reed, S.E., et al., "Training Deep Neural Networks on Noisy Labels with Bootstrapping", Retrieved from https://arxiv.org/pdf/1412.6596.pdf, Dec. 20, 2014, pp. 1-11.

Rosenberg, et al., "Color Constancy Using KL-Divergence", In Proceedings of IEEE International Conference on Computer Vision, vol. 1, Jul. 7-14, 2001, pp. 239-246.

(56) References Cited

OTHER PUBLICATIONS

Shelhamer, E., et al., "Fully Convolutional Networks for Semantic Segmentation", In Proceedings of IEEE Transactions on Pattern Analysis and Machine Intelligence, vol. 39 Issue 4, Apr. 2017, pp. 640-651.

Shi, W., et al., "Deep Specialized Network for Illuminant Estimation", In Proceedings of European Conference on Computer Vision, Jan. 2016, pp. 1-17.

Shi, L., et al., "Re-processing Version of Gehler's Raw Dataset", Retrieved from the Internet: <URL: https://web.archive.org/web/20170524122712/http://www.cs.sfu.ca:80/~colour/data/shi_gehler/>, Sep. 18, 2000, 2 Pages.

Simonyan, K., "Very Deep Convolutional Networks for Large-Scale Image Recognition", In Proceedings of International Conference on Learning Representations, Sep. 4, 2015, 14 Pages.

Srivastava, et al., "Dropout a Simple Way to Prevent Neural Networks from Overfitting", In Journal of Machine Learning Research, vol. 15 Issue 1, Jan. 1, 2014, pp. 1929-1958.

Sukhbaatar, S., et al., "Training Convolutional Networks with Noisy Labels", In Proceedings of International Conference on Learning Representations, Jun. 9, 2014, pp. 1-11.

Van De Weijer, J., "Edge-based color constancy", In Proceedings of IEEE Transactions on Image Processing, vol. 16 Issue 9, Sep. 2007, pp. 2207-2214.

Xiao, T., "Learning From Massive Noisy Labeled Data for Image Classifcation", In Proceedings of Computer Vision and Pattern Recognition, Jun. 7, 2015, pp. 2691-269.

Hu et al., "FC: Fully Convolutional Color Constancy with Confidence-weighted Pooling", Supplementary Material, In Proceedings of the IEEE Conference on Computer Vision and Pattern Recognition, 2017, 10 Pages.

\* cited by examiner

FULLY CONVOLUTIONAL COLOR CONSTANCY WITH CONFIDENCE WEIGHTED POOLING

BACKGROUND

Computer vision applications are becoming more and more popular as both the hardware and the software becomes more advanced. These applications include self-driving vehicles, object recognition, security, and others.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Problems in source images complicate the use of computer vision algorithms. For example, images may have unnatural color casts (e.g., green, red, yellow, blue) that affect the accuracy of image processing. In some examples, prior to use in computer vision techniques, images may be pre-processed to correct for various image defects. For example, preprocessing to achieve computational color constancy, where the goal is to remove illumination color casts in images.

Removing color casts may benefit downstream applications such as visual recognition, where color is an important feature for distinguishing objects. Despite various needs for accurate color constancy, there remains much room for improvement among current algorithms due to the significant challenges that this task presents. Previous approaches to removing color casts included statistics-based approaches that assumed certain statistical properties of natural scenes, such as an average surface reflectance of gray. The statistics-based approach then solved for an illumination color that corrected the deviation of an image from those properties.

Another previous technique used machine learning by harnessing the power of convolutional neural networks (CNNs) to learn color constancy models from large training sets, composed of photographs and their associated labels for illumination color. Many of these networks operate on sampled image patches as input, and produce corresponding local estimates that are subsequently pooled into a global result. The CNN approach is generally more accurate than the statistic based approach. However, there are still problems with the traditional CNN approach.

For example, for CNN approaches there is often ambiguity in local estimates. For example, if there is a picture with a wall that appears yellow, it is unknown whether it is a white wall under yellow illumination or a yellow wall under white illumination. Stated differently, when inferring the illumination color in a patch, or equivalently the reflectance colors within the local scene area, it is often the case that the patch contains little or no semantic context to help infer its reflectance or illumination. If the classes of objects within a patch may be of arbitrary reflectance (such as a painted wall), then there may be a broad range of illuminations that may plausibly explain the patch's appearance in an image. On the other hand, patches containing objects that have an innate color (such as bananas) provide cues that are much more informative for color constancy estimation. As noted previously, patch-based CNNs have difficulty resolving the ambiguity in certain patches. In patch-based CNNs, each patch is treated equally, even though patches that are ambiguous for color constancy provide little or no value, and furthermore inject noise into both CNN training and inference. Noisy data adversely affects CNN-based estimation. For color constancy, noise is an especially concerning issue, since ambiguous patches occur at high frequency within many photographs and may diminish the influence of more valuable patches.

Disclosed in some examples, are methods, systems, and machine readable mediums that address the problems of previous CNN solutions by utilizing a fully convolutional network (FCN), where the patches in an input image may differ in influence over the color constancy estimation. This influence is formulated as a confidence weight that reflects the value of a patch for inferring the illumination color. The confidence weights are integrated into a pooling layer where the confidence weights are applied to local patch estimates in determining a global color constancy result. In contrast to existing patch-based CNNs which process patches sequentially and individually, this method considers all of the image patches together at the same time. This allows the usefulness of patches to be compared and learned diming training. In this way, the presently disclosed network may learn from color constancy datasets about which local areas in an image are informative for color constancy and how to combine their information to produce a final estimation result.

The present network design with joint-patch processing and confidence-weighted pooling not only distinguishes between useful and noisy data in both the training and evaluation phases, but also confers other advantages including end-to-end training, direct processing of images with arbitrary size, and much faster computation. Aside from its utility for color constancy, the described system for learning and pooling confidence weights may moreover be useful for other vision problems in which a global estimate is determined from aggregated local inferences.

Figure 1:
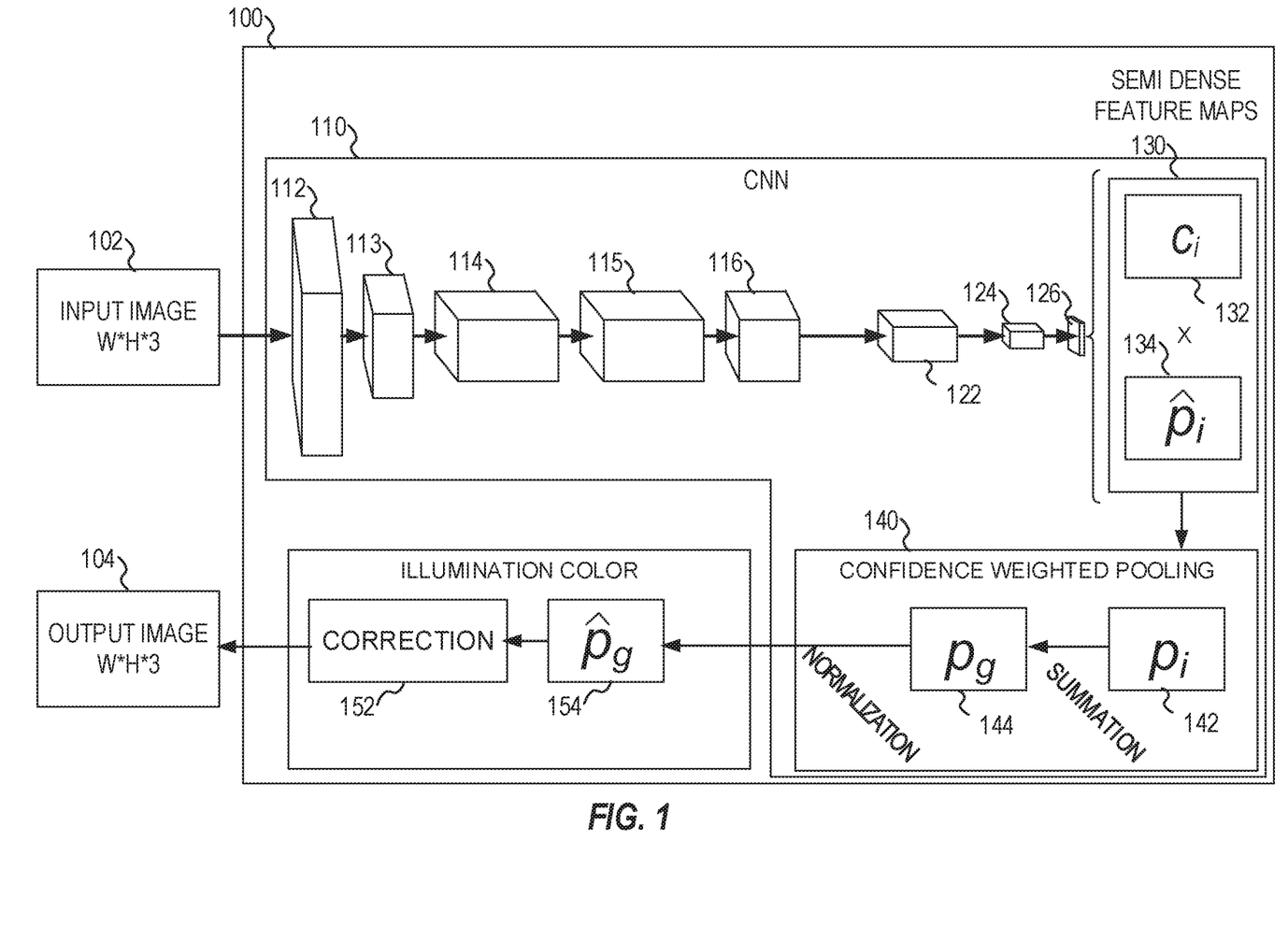
FIG. 1 shows a diagram of a fully convolutional neural network according to some examples of the present disclosure.

Turning now to FIG. 1, a diagram of an FCN network is shown according to some examples of the present disclosure. In FIG. 1, the input image 102 is transformed into the output image 104 by utilizing a multi-layer CNN 110 which produces semi-dense feature maps that estimate the color cast of particular patches $\hat{p}_i$ and an estimated confidence value of each of those patches $c_i$. This includes a confidence weighted pooling layer 140 which pools the patches and confidence values to produce an illumination color that is then used to produce the output image 104. FIG. 1 will be explored in more detail later.

As previously noted, previous patch-based CNNs apply a conventional convolutional network to extract local features which are then pooled or passed to a support vector regressor to estimate illumination color. Later methods used a more advanced network to deal with estimation ambiguities, where multiple illumination hypotheses are generated for each patch in a two-branch structure, and a selection sub-network adaptively chooses an estimate from among the hypotheses.

In contrast, the presently disclosed method employs a selection mechanism, but instead selects which patches in an image are used for estimation. Learning the semantic value of local regions makes the disclosed approach more robust to the estimation ambiguities as semantically ambiguous patches may then be prevented from influencing the illumination estimation.

As noted, the presently disclosed method uses fully convolutional networks (FCNs). The disclosed FCNs differ from conventional FCNs in that the up sampling to produce pixel-wise output is replaced with a pooling layer that fuses the feature map into a single output. With its confidence-weighted pooling layer, the disclosed FCN is able to intelligently combine local estimates into a global one, and also dispatch supervisory signals only to semantically valuable regions during training. In short, it learns "what to learn" and "how to pool."

FCNs are conventionally trained with pixel-level annotations. To relax this need for full supervision, some methods for semantic segmentation have instead been formulated for weak supervision using image level tags, which constrain the pixel-level loss with respect to a latent distribution of pixel labels or simply a multiclass label set. The presently disclosed FCN, by contrast, enforces image-level labels on a global loss function defined through weighted pooling. In addition, the image-level labels are used not only to guide the network toward producing a certain output, but also to learn what parts of an input image should be used for inference.

Given an RGB image I, the method estimates its global illumination color $p_g=(r, g, b)$ so that the color cast may be removed from the image by replacing the normalized illumination color $$\hat{p}_g = \frac{p_g}{\|p_g\|_2}$$

with a canonical light source color (usually pure white):

$$\left(\frac{1}{\sqrt{3}}, \frac{1}{\sqrt{3}}, \frac{1}{\sqrt{3}}\right)^T.$$

While there may be multiple illuminants in a scene, the method focuses on the traditional problem of estimating a single global illumination color.

A function $f_\theta$ may be found so that $f_\theta = \hat{p}_g$ is as close to the ground truth as possible. $f_\theta$ may be represented as a convolutional neural network parameterized by $\theta$. The normalized ground truth illumination color may be denoted $\hat{p}_g^*$. Then, $f_\theta$ may be learned by minimizing a loss function, defined as the angular error (in degrees) between its estimate $\hat{p}_g$ and the ground truth $\hat{p}_g^*$:

$$L(\hat{p}_g) = \frac{180}{\pi} \arccos(\hat{p}_g * \hat{p}_g^*) \qquad \text{eqn (1)}$$

As previously described, the ideal color constancy function $f_\theta$ encourages all the semantically informative regions while suppressing the negative impact of ambiguous ones. Therefore, the method (1) outputs the estimate for each local region within I, and (2) aggregates those local estimates into a global one in an adaptive manner. Suppose $R=\{R_1, R_2, \ldots, R_N\}$ is a set of overlapping local regions in image I, and function $g(R_i)$ outputs the regional light color estimate for $R_i$. Then for $f_\theta$ to effectively aggregate all the $g(R_i)$ to generate the final result, we define:

$$f_\theta(I) = \hat{p}_g = \text{normalize}\left(\sum_{i \in R} c(R_i) g(R_i)\right) \qquad \text{eqn (2)}$$

where $c(R_i)$ is a weighting function that represents the confidence value of $R_i$, intuitively, if $R_i$ is a local region that contains useful semantic context for illumination estimation, then $c(R_i)$ should be large.

The disclosed methods are an end-to-end deep learning system that may naturally embed both g and c into $f$, even though there is no explicit supervision for either g or c. The FCN learns to fuse optimal combinations of local estimates, through adaptive use of the corresponding g and c for each local region such that the impact of ambiguous patches will be suppressed. Toward this end, the presently disclosed architecture is based on an FCN with a weighted pooling layer that are tailored for the color constancy problem.

Following the observation that mid-level semantic information provides more clues for illumination estimation, the system extracts medium-sized window regions $R=\{R_i\}$ from I as square subsets of the image. For each region, the estimate made by function $g(R_i)$ is denoted $\hat{p}_i$. Unlike previous patch-based systems which treat each $R_i$ independently over an image and use a CNN to learn g, the present system instead considers all of the local patches within the same image jointly so that their relative importance for estimating the global illumination color may be well explored. Therefore, given an image, the present system determines the local estimates simultaneously. An FCN is used to accomplish this goal by sharing all the convolution computations in a natural way and predicting all the spatially local estimates at the same time. In addition, an FCN may take an input of any size, which avoids distortions of semantic information that may occur with CNN systems that employ resizing.

Turning back to FIG. 1, a diagram of an FCN network is shown according to some examples of the present disclosure. The input image 102 of dimension W, H, and RGB color information is fed into the layers of a convolutional neural network (CNN) 110. Each convolutional layer (e.g., layers 112, 113, 114, 115, 116, 124, and 126 may include one or more convolution, Rectified Linear Unit (ReLu), and pooling layers (e.g., a MAX pooling layer). Layer 122 may be a separate max pooling layer. In some examples, the CNN 110 is a seven-layer CNN with dimensions of:

$$\text{layer } 112 = \frac{W}{4} \times \frac{H}{4} \times 96, \quad \text{layer } 113 = \frac{W}{8} \times \frac{H}{8} \times 256,$$

$$\text{layer } 114 = \frac{W}{16} \times \frac{H}{16} \times 384, \quad \text{layer } 115 = \frac{W}{16} \times \frac{H}{16} \times 384, \text{ and}$$

$$\text{layer } 116 = \frac{W}{16} \times \frac{H}{16} \times 256,$$

A max pooling layer 122 is in some examples of dimensionality $$\frac{W}{32} \times \frac{H}{32} \times 256$$

and pools the output from convolutional layer 116 and that output is then fed into a large conv6 (with filter size 6×6×64) layer 124 (with an example dimensionality of $$\frac{W}{32} \times \frac{H}{32} \times 64)$$

and subsequent conv7 (with filter size 1×1×4 for dimensionality reduction) layer 126 (with an example dimensionality of $$\frac{W}{32} \times \frac{H}{32} \times 4)$$

to extract semi-dense feature maps 130. It will be appreciated by one of ordinary skill in the art that convX is shorthand for the Xth convolutional layer (e.g., conv5 is the fifth convolutional layer and conv6 is the sixth convolutional layer). For example, the CNN 110 may be built using a CNN such as one or more layers of AlexNet, which may be pre-trained on a public database of images, such as ImageNet. In some examples, the CNN may include the first five layers of AlexNet, plus a max pooling layer 122, a conv6 layer 124, a conv7 layer 126, and the confidence weighted pooling layer 140. Example neural network dimensions are shown on the image for each stage, however, one of ordinary skill with the benefit of the present disclosure will appreciate that other dimensions may be utilized. The semi dense feature maps 130 output by the conv7 layer 126 include the color estimates 134 $\hat{p}_i$ (after normalization) and the confidence values 132 $C_i$. Those feature maps are passed to a confidence weighted pooling layer 140 where the weighted estimates 142 are summed to produce an estimate 144 that is then normalized to produce a normalized estimate 154 which is used to apply a color correction 152 to produce an output 104.

Note that within the four channels in the semi-dense feature maps the first three channels represent the color triplet $\hat{p}_i = g(R_i)$ estimated from each corresponding patch, while the last channel represents its confidence $c_i = c(R_i)$ in contributing to the final global estimation. The four channels are passed through a ReLU layer to avoid negative values, and the final estimated RGB channels are $l^2$ normalized per pixel. The weighted estimate $p_i$ as $c_i\hat{p}_i$. While the above disclosure utilized a seven layer CNN, one of ordinary skill in the art will appreciate that less than seven layers or more than seven layers may be utilized.

As explained earlier, different local regions may differ in value for illumination estimation based on their semantic content. To treat these patches differently, a function $c(R_i)$ is regressed to output the confidence values of the corresponding estimates. Although a function c could be modeled as a separate fully convolutional branch originating from conv5 or even lower layers, it is more straightforward to implement it jointly as a fourth channel that is included with the three color channels of each local illumination estimate. The final result is simply a weighted-average pooling of all the local estimates, as expressed in Eqn. 3 and 4 (below).

Note that patch based training with average pooling may be regarded as a special case of the presently disclosed network by setting each $c(R_i)=1$. In the disclosed network, thanks to the FCN architecture, convolutional operations are shared among patches within the same image, while for the patch-based CNNs each patch needs to go through the same network sequentially. There also exist other pooling methods, such as fully connected pooling or max-pooling; however, they either lack flexibility (i.e., require a specific input image size) or have been shown to be not very effective for color constancy estimation. Median pooling does a better job as it prevents outliers from contributing directly to the global estimation, but it does not completely eliminate their impact when a significant proportion of the estimates are noisy. Furthermore, even if it was incorporated in an end-to-end training pipeline, the loss may only back-propagate to a single (median) patch in the image each time, ignoring pairwise dependencies among the patches.

Mathematical Analysis

During back-propagation, the pooling layer serves as a "gradient dispatcher" which back propagates gradients to local regions with respect to their confidence. Let us take a closer look at the pooling layer by differentiating the loss function with respect to a local estimate $\hat{p}_i$ and confidence $c(R_i)$ denoted as $c_i$ for simplicity). The weighted pooling is defined as:

$$p_g = \sum_{i \in R} c_i \hat{p}_i \qquad \text{eqn (3)}$$

$$\hat{p}_g = \frac{p_g}{\|p_g\|_2} = \frac{1}{\|p_g\|_2} \sum_{i \in R} c_i \hat{p}_i \qquad \text{eqn (4)}$$

After some derivation (see below for detail):

$$\frac{\partial L(\hat{p}_g)}{\partial \hat{p}_i} = \frac{c_i}{\|p_g\|_2} \cdot \frac{\partial L(\hat{p}_g)}{\partial \hat{p}_g} \qquad \text{eqn (5)}$$

Based upon the above, it will be appreciated that among the estimates $\hat{p}_i$ their gradients all share the same direction but have different magnitudes that are proportional to the confidence $c_i$, So for local estimates, the confidence serves as a mask for the supervision signal, which prevents the network from learning noisy data. Similarly, for confidence $c_i$:

$$\frac{\partial L(\hat{p}_g)}{\partial c_i} = \frac{1}{\|p_g\|_2} \cdot \frac{\partial L(\hat{p}_g)}{\partial \hat{p}_g} \cdot \hat{p}_i \qquad \text{eqn (6)}$$

Intuitively, as long as a local estimate helps the global estimation get closer to the ground truth, the network increases the corresponding confidence. Otherwise, the confidence will be reduced. This is exactly how the confidence should be learned.

Additional Backpropagation details:
First, the Jacobian $$J_{3 \times 3} = \frac{\partial \hat{x}}{\partial x}$$

for a 3D vector x is derived. Each entry of J is deduced as follows:

$$J_{ij} = \left[\frac{\partial\left(\frac{x}{\|x\|_2}\right)}{\partial x}\right]_{ij} \quad \text{eqn (7)}$$

$$= \frac{\partial\left(\frac{x_i}{\|x\|_2}\right)}{\partial x_j} \quad \text{eqn (8)}$$

$$= \frac{1}{\|x\|_2^2}\left(\|x\|_2 \frac{\partial x_i}{\partial x_j} - x_i \frac{\partial \|x\|_2}{\partial x_j}\right) \quad \text{eqn (9)}$$

$$= \frac{1}{\|x\|_2}\left(\frac{\partial x_i}{\partial x_j} - \hat{x}_i \frac{\partial \|x\|_2}{\partial x_j}\right) \quad \text{eqn (10)}$$

$$= \frac{1}{\|x\|_2}\left(\delta_{ij} - \hat{x}_i \frac{\partial \left(\sum_k x_k^2\right)^{\frac{1}{2}}}{\partial x_j}\right) \quad \text{eqn (11)}$$

$$= \frac{1}{\|x\|_2}\left(\delta_{ij} - \hat{x}_i \frac{x_j}{\|x\|_2}\right) \quad \text{eqn (12)}$$

$$= \frac{1}{\|x\|_2}(\delta_{ij} - \hat{x}_i \hat{x}_j) \quad \text{eqn (13)}$$

Where $$\delta_{ij} = \begin{cases} 0 & i \neq j \\ 1 & i = j \end{cases} \quad \text{eqn (14)}$$

Figure 2:
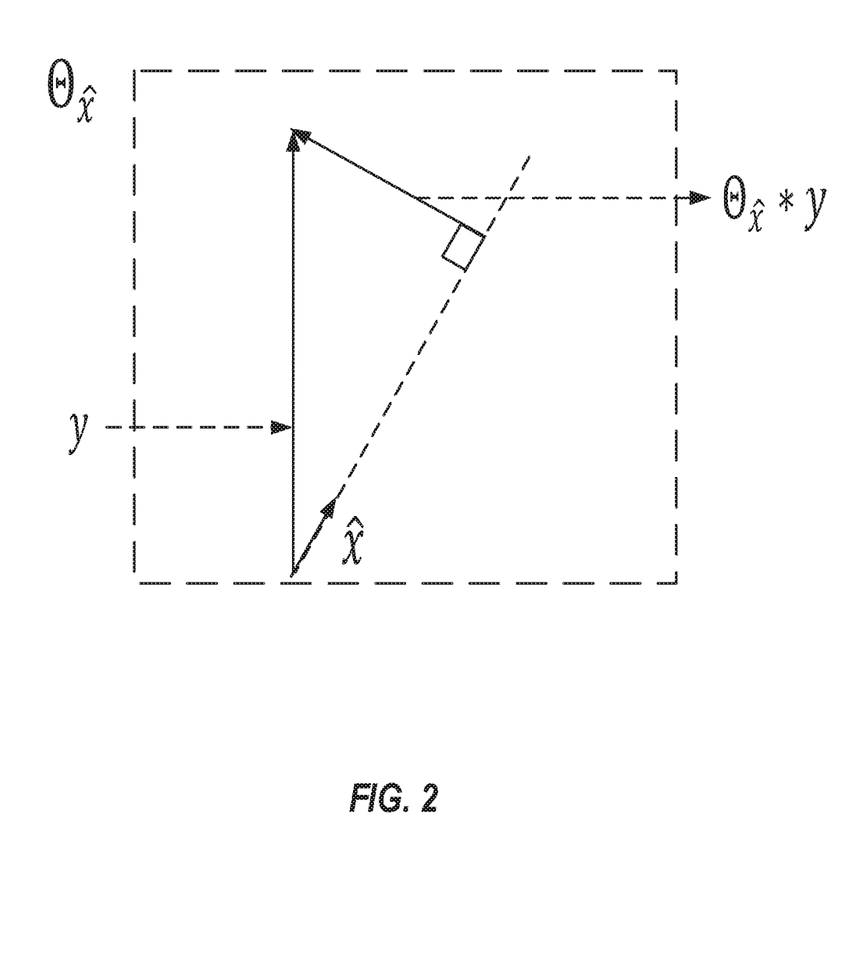
FIG. 2 shows a diagram of a vector y and the orthogonal part of y with respect to x̂ according to some examples of the present disclosure.

In matrix notation, $$J = \frac{1}{\|x\|_2}(I_3 - \hat{x} \otimes \hat{x}) = \frac{1}{\|x\|_2}\Theta_{\hat{x}} \quad \text{eqn (15)}$$

Where $I_3$ is the 3×3 identity matrix and "⊗" denotes tensor product. $\Theta_{\hat{x}} = I_3 - \hat{x} \otimes \hat{x}$ is a symmetric matrix that takes as input a vector y and outputs the orthogonal part of y with respect to $\hat{x}$, as illustrated by FIG. 2. Substituting x with $p_g$ we have:

$$\frac{\partial \hat{p}_g}{\partial p_g} = \frac{1}{\|p_g\|_2}\Theta_{\hat{p}_g} \quad \text{eqn (16)}$$

To facilitate differentiation, the domain of the angular loss function L is extended from $\{x | x \in \mathcal{R}_{30}^3, \|x\|_2 = 1\}$ to $\{x | x \in \mathcal{R}_+^3\}$ dropping the normalized constraint. The extended loss function L is defined as:

$$L(x) = \arccos\left(\frac{x}{\|x\|_2} \cdot \hat{p}_g^*\right) \quad \text{eqn (17)}$$

One important property of this loss function is that its gradient with respect to x is orthogonal to x, or:

$$x^T\left(\frac{\partial L(x)}{\partial x}\right)^T = 0 \quad \text{eqn (17)}$$

Since increasing the length of x does not affect the angular loss, which is defined purely on the direction of x, i.e., $$\frac{x}{\|x\|_2}.$$

From its symmetry and the fact that $\Theta_{\hat{p}_g}$ returns the orthogonal component of a vector with respect to $\hat{p}_g$, we have:

$$\frac{\partial L(\hat{p}_g)}{\partial \hat{p}_g} \cdot \Theta_{\hat{p}_g} \quad \text{eqn (18)}$$

$$= \left(\Theta_{\hat{p}_g}^T \cdot \left(\frac{\partial L(\hat{p}_g)}{\partial \hat{p}_g}\right)^T\right)^T \quad \text{eqn (19)}$$

$$= \left(\Theta_{\hat{p}_g} \cdot \left(\frac{\partial L(\hat{p}_g)}{\partial \hat{p}_g}\right)^T\right)^T \quad \text{eqn (20)}$$

$$= \left(\left(\frac{\partial L(\hat{p}_g)}{\partial \hat{p}_g}\right)^T\right)^T \quad \text{eqn (21)}$$

$$= \frac{\partial L(\hat{p}_g)}{\partial \hat{p}_g} \quad \text{eqn (21)}$$

As may be appreciated, the term $\Theta_{\hat{p}_g}$ is eliminated.

With the aforementioned prerequisites, to simplify the derivative of the loss function, with respect to each local estimate $\hat{p}_i$ and confidence $c_i$:

$$\frac{\partial L(\hat{p}_g)}{\partial \hat{p}_i} = \frac{\partial L(\hat{p}_g)}{\partial \hat{p}_g} \cdot \frac{\partial \hat{p}_g}{\partial p_g} \cdot \frac{\partial p_g}{\partial \hat{p}_i} \quad \text{eqn (22)}$$

$$= \frac{\partial L(\hat{p}_g)}{\partial \hat{p}_g} \cdot \frac{1}{\|p_g\|_2}\Theta_{\hat{p}_g} \cdot c_i I_3 \quad \text{eqn (23)}$$

$$= \frac{c_i}{\|p_g\|_2} \cdot \frac{\partial L(\hat{p}_g)}{\partial \hat{p}_g} \cdot \Theta_{\hat{p}_g} \quad \text{eqn (24)}$$

$$= \frac{c_i}{\|p_g\|_2} \cdot \frac{\partial L(\hat{p}_g)}{\partial \hat{p}_g} \quad \text{eqn (25)}$$

And $$\frac{\partial L(\hat{p}_g)}{\partial \hat{c}_i} = \frac{\partial L(\hat{p}_g)}{\partial \hat{p}_g} \cdot \frac{\partial \hat{p}_g}{\partial p_g} \cdot \frac{\partial p_g}{\partial c_i} \quad \text{eqn (26)}$$

$$= \frac{\partial L(\hat{p}_g)}{\partial \hat{p}_g} \cdot \frac{1}{\|p_g\|_2}\Theta_{\hat{p}_g} \cdot \hat{p}_i \quad \text{eqn (27)}$$

$$= \frac{1}{\|p_g\|_2} \cdot \frac{\partial L(\hat{p}_g)}{\partial \hat{p}_g} \cdot \Theta_{\hat{p}_g} \cdot \hat{p}_i \quad \text{eqn (28)}$$

$$= \frac{1}{\|p_g\|_2} \cdot \frac{\partial L(\hat{p}_g)}{\partial \hat{p}_g} \cdot \hat{p}_i \quad \text{eqn (29)}$$

There are two main observations from this analysis of the backpropagation. The first is that the strength of the supervision signal toward a local estimate is proportional to the confidence for its local area, as may be determined from equation 29 (eqn) above. Notice in the equation that for all of the local estimates there is the same global gradient direction, and that they differ only in magnitude according to confidence $c_i$. Since the supervision focuses on local areas with higher confidence, the network essentially concentrates its learning on areas helpful for estimation, while disregarding "noisy" regions of low confidence. The second takeaway is that, as seen from Equation 29, the supervision for confidence values depends on whether a local estimate lies along a direction that leads to a better global estimate. If a local estimate is helpful in improving the global estimate, then its confidence will increase. Otherwise, it is reduced. In this way, the network learns how to pool local estimates to produce a desired global result.

Figure 3:
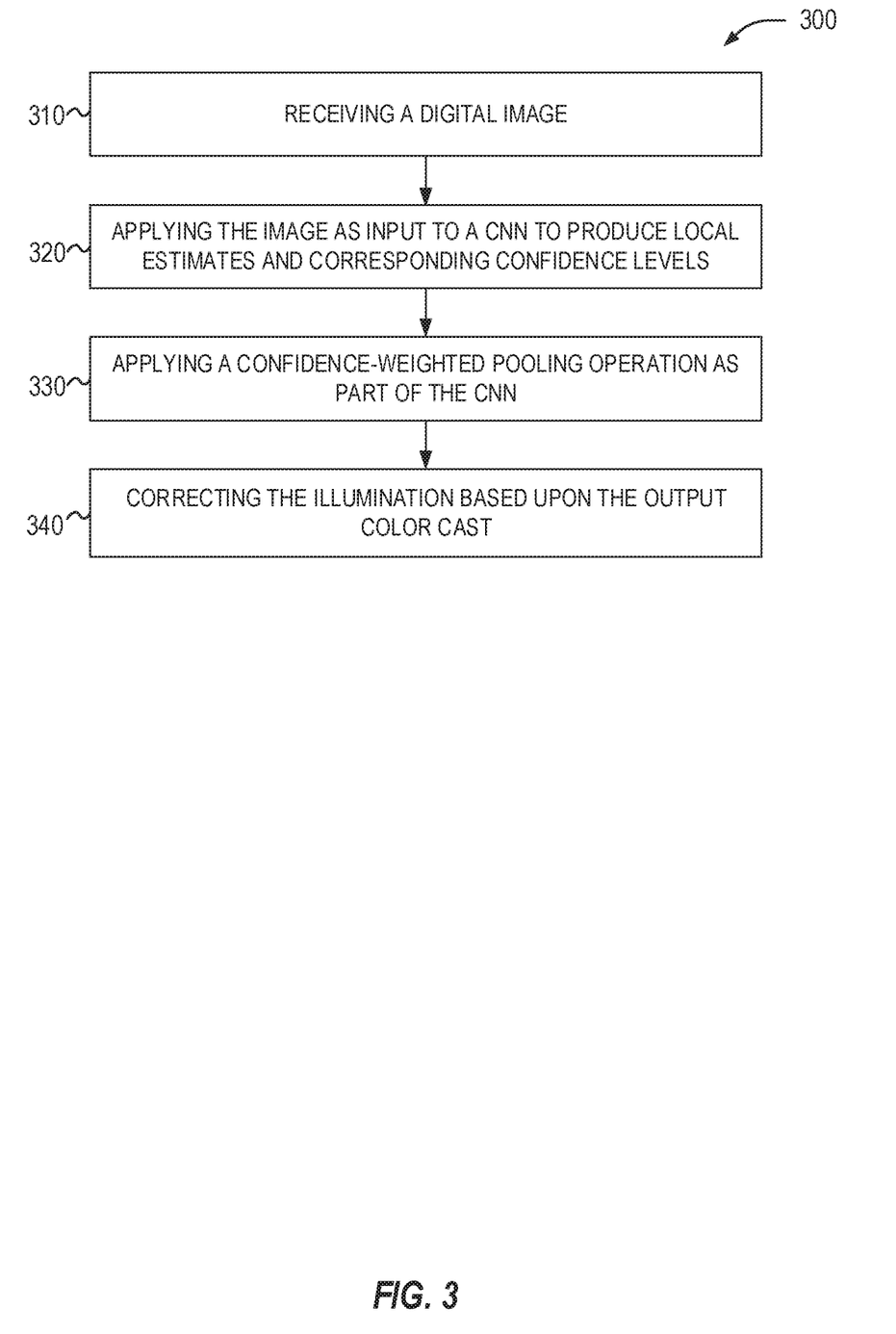
FIG. 3 shows a method of color correction according to some examples of the present disclosure.

FIG. 3 shows a method 300 of color correction according to some examples of the present disclosure. At operation 310 a digital image is received. The digital image may be received over a network, or may be retrieved from local storage, passed to the color correction system over an Application Programming interface (API) and the like. The digital image may be a vector of (r,g,b) color values for each of a set of pixels that may be organized in a (x,y) array. At operation 320, the image may be applied to a convolutional neural network. For example, the image may be applied as input to a seven layer CNN that is trained using a library of images labeled with the color casts on those images. For example, the image may be applied to the CNN described in FIG. 1. As part of the CNN, one or more layers may output semi-dense feature maps that consist of local estimates and confidence values for those local estimates.

At operation 330 the local estimates and confidence values are applied within a confidence-weighted pooling layer of the CNN. For example, the confidence value and the local estimate are multiplied for each local estimate to produce a confidence weighted estimate. Each confidence weighted estimate for each region are then summed. Stated differently, the local estimates are weighted by their corresponding confidence values and the weighted local estimates are then summed to produce a final color cast. At operation 340 the image may be corrected based upon the output color cast. For example using a white balance adjustment algorithm. Once the image is corrected, in some examples, additional algorithms may be applied to the image, such as object recognition algorithms to detect objects, facial recognition algorithms to detect faces, and the like.

Figure 4:
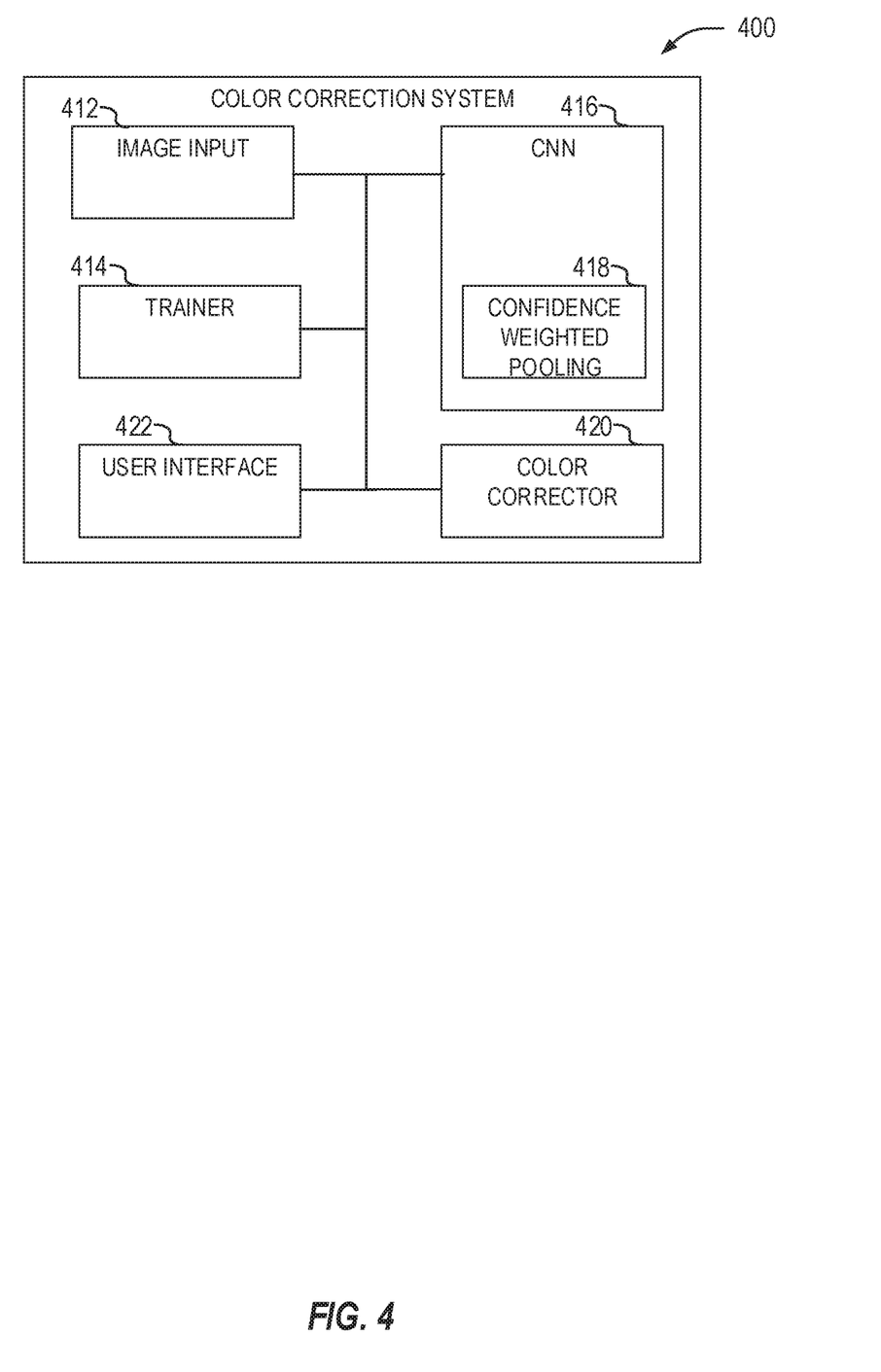
FIG. 4 shows a color correction system according to some examples of the present disclosure.

Turning now to FIG. 4, a color correction system 400 is shown according to some examples of the present disclosure. The color correction system 400 may implement the system 100 from FIG. 1. Image input 412 receives images over a network, from local storage, and/or from a different application over an Application Programming Interface (API). The image input 412 then passes the image to a CNN 416. CNN 416 may be seven-layer CNN 110, for example, that shown in FIG. 1. CNN 416 may include a confidence weighted pooling 418 which may take as input the semi dense feature maps 130 of FIG. 1. Confidence weighted pooling 418 is one example of confidence weighted pooling layer 140 of FIG. 1. Color correction 420 utilizes the result of confidence weighted pooling 418 to correct the color cast of an input image. Color correction 420 may be an example of color correction 152 of FIG. 1. Trainer 414 may take as input a set of training images and corresponding labels that identify the color cast for each of the training images. The trainer 414 may utilize the algorithms disclosed herein to train the CNN to produce the local estimates and the confidence scores.

In some examples, the system of FIG. 4 may be local— that is, an application executing on a user's computing device (e.g., personal computer, tablet computer, smartphone, digital camera, and the like) may correct the color cast. In other examples, the system of FIG. 4 may be a network-based service. That is, users may upload photos to the service for correction. The corrected photos may then be returned to the user. In these examples, user interface 422 may provide one or more Graphical User Interface (GUI) descriptors that may be downloaded and rendered by a user in a browser of the user. The GUI descriptors may facilitate the user in selecting and uploading unprocessed images and downloading processed images. Similarly, if the system 400 is local, the user interface 422 may render the user interface by utilizing API calls of an Operating System (OS) executing on the computing device of the user. These user interfaces may facilitate the user in selecting and processing images. One of ordinary skill in the art, with the benefit of the present disclosure will appreciate that other possibilities exist whereby some of the system 400 is remote and some of the system is local to the user.

Additionally, one of ordinary skill with the benefit of the present disclosure will also appreciate that the components of FIG. 4 are exemplary, and functions of one component may be performed by functions of a different component and furthermore that functions of a particular component may be subdivided into multiple components.

Figure 5:
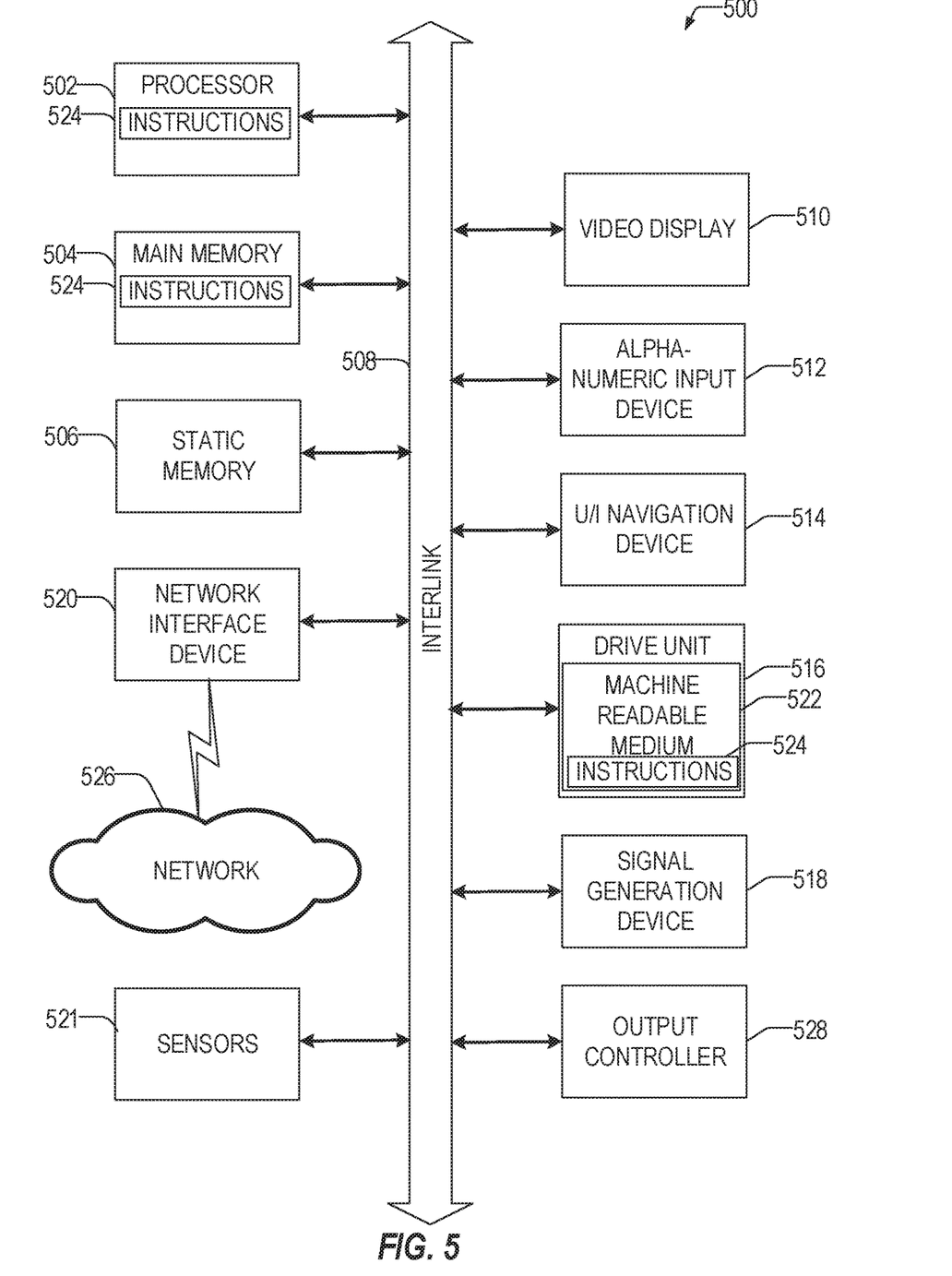
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 500 may implement the systems of FIG. 1 and FIG. 4 and the method of FIG. 3. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. For example, the modules of FIGS. 1 and 4. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared(M), near field communication (NFC), etc) connection to communicate or control one or more peripheral devices (e.g., a printer, card reader, etc).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520. The Machine 500 may communicate with one or more other machines utilizing any one of a number of transfer protocols (e.g., frame relay, internet protocol (IP), transmission control protocol (TCP), user datagram protocol (UDP), hypertext transfer protocol (I-ITTP), etc). Example communication networks may include a local area network (LAN), a wide area network (WAN), a packet data network (e.g., the Internet mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

OTHER NOTES AND EXAMPLES

Example 1 is a system for removing illumination color casts in a digital image, the system comprising: a processor; a memory, the memory including instructions, which when performed by the processor, causes the system to perform operations comprising: receiving the digital image; applying the digital image as input to a convolutional neural network (CNN), the CNN producing a plurality of local estimates of the digital image and corresponding confidence values for the plurality of local estimates, wherein the CNN comprises a layer applying a confidence-weighted pooling operation to the plurality of local estimates of the digital image and the corresponding confidence values to produce an output color cast; and correcting the illumination color casts of the image by rebalancing the image to remove the color cast to create an output digital image.

In Example 2, the subject matter of Example 1 optionally includes wherein the CNN comprises a convolution layer, a Rectified. Linear Unit layer, and a max pooling layer.

In Example 3, the subject matter of any one or more of Examples 1-2 optionally include wherein the CNN is a seven-layer convolutional neural network.

In Example 4, the subject matter of any one or more of Examples 1-3 optionally include wherein the operations further comprise regressing a function $c(R_i)$ to produce the corresponding confidence values of the plurality of local estimates, wherein $R_i$ are a set of the plurality of local estimates.

In Example 5, the subject matter of any one or more of Examples 1-4 optionally include wherein the confidence-weighted pooling operation comprises calculating a summation of the plurality of local estimates weighted by their corresponding confidence values.

In Example 6, the subject matter of any one or more of Examples 1-5 optionally include wherein the operations further comprise training the CNN on a set of training images, the respective training images labelled with an illumination color cast of the image, and wherein the training minimizes a loss function, the loss function defined as an angular error between an estimated color cast and the labelled illumination color cast.

In Example 7, the subject matter of any one or more of Examples 1-6 optionally include wherein the output digital image is input to an object recognition algorithm that recognizes an object in the output digital image.

Example 8 is a machine-readable medium including instructions, which when executed by a machine, causes the machine to perform operations comprising: receiving a digital image; applying the digital image as input to a convolutional neural network (CNN), the CNN producing a plurality of local estimates of the digital image and corresponding confidence values for the plurality of local estimates, wherein the CNN comprises a layer applying a confidence-weighted pooling operation to the plurality of local estimates of the digital image and the corresponding confidence values to produce an output color cast; and correcting the illumination color casts of the image by rebalancing the image to remove the color cast to create an output digital image.

In Example 9, the subject matter of Example 8 optionally includes wherein the CNN comprises a convolution layer, a Rectified Linear Unit layer, and a max pooling layer.

In Example 10, the subject matter of any one or more of Examples 8-9 optionally include wherein the CNN is a seven-layer convolutional neural network.

In Example 11, the subject matter of any one or more of Examples 8-10 optionally include wherein the instructions further comprise regressing a function $c(R_i)$ to produce the corresponding confidence values of the plurality of local estimates, wherein $R_i$ are a set of the plurality of local estimates.

In Example 12, the subject matter of any one or more of Examples 8-11 optionally include wherein the confidence-weighted pooling operation comprises calculating a summation of the plurality of local estimates weighted by their corresponding confidence values.

In Example 13, the subject matter of any one or more of Examples 8-12 optionally include wherein the operations comprise training the CNN on a set of training images, the respective training images labelled with an illumination color cast of the image, and wherein the training minimizes a loss function, the loss function defined as an angular error between an estimated color cast and the labelled illumination color cast.

In Example 14, the subject matter of any one or more of Examples 8-13 optionally include wherein the output digital image is input to an object recognition algorithm that recognizes an object in the output digital image.

Example 15 is a method for removing illumination color casts in a digital image, the method comprising: receiving the digital image; applying the digital image as input to a convolutional neural network (CNN), the CNN producing a plurality of local estimates of the digital image and corresponding confidence values for the plurality of local estimates, wherein the CNN comprises a layer applying a confidence-weighted pooling operation to the plurality of local estimates of the digital image and the corresponding confidence values to produce an output color cast; and correcting the illumination color casts of the image by rebalancing the image to remove the color cast to create an output digital image.

In Example 16, the subject matter of Example 15 optionally includes wherein the CNN comprises a convolution layer, a Rectified Linear Unit layer, and a max pooling layer.

In Example 17, the subject matter of any one or more of Examples 15-16 optionally include wherein the CNN is a seven-layer convolutional neural network.

In Example 18, the subject matter of any one or more of Examples 15-17 optionally include wherein the method further comprises regressing a function $c(R_i)$ to produce the corresponding confidence values of the plurality of local estimates, wherein $R_1$ are a set of the plurality of local estimates.

In Example 19, the subject matter of any one or more of Examples 15-18 optionally include wherein the confidence-weighted pooling operation comprises calculating a summation of the plurality of local estimates weighted by their corresponding confidence values.

In Example 20, the subject matter of any one or more of Examples 15-19 optionally include training the CNN on a set of training images, the respective training images labelled with an illumination color cast of the image, and wherein the training minimizes a loss function, the loss function defined as an angular error between an estimated color cast and the labelled illumination color cast.

In Example 21, the subject matter of any one or more of Examples 15-20 optionally include wherein the output digital image is input to an object recognition algorithm that recognizes an object in the output digital image.

Example 22 is a device for removing illumination color casts in a digital image, the device comprising: means for receiving the digital image; means for applying the digital image as input to a convolutional neural network (CNN), the CNN producing a plurality of local estimates of the digital image and corresponding confidence values for the plurality of local estimates, wherein the CNN comprises a layer applying a confidence-weighted pooling operation to the plurality of local estimates of the digital image and the corresponding confidence values to produce an output color cast; and means for correcting the illumination color casts of the image by rebalancing the image to remove the color cast to create an output digital image.

In Example 23, the subject matter of Example 22 optionally includes wherein the CNN comprises a convolution layer, a Rectified Linear Unit layer, and a max pooling layer.

In Example 24, the subject matter of any one or more of Examples 22-23 optionally include wherein the CNN is a seven-layer convolutional neural network.

In Example 25, the subject matter of any one or more of Examples 22-24 optionally include means for regressing a function $c(R_i)$ to produce the corresponding confidence values of the plurality of local estimates, wherein $R_i$ are a set of the plurality of local estimates.

In Example 26, the subject matter of any one or more of Examples 22-25 optionally include wherein the means for confidence-weighted pooling operation comprises means for calculating a summation of the plurality of local estimates weighted by their corresponding confidence values.

In Example 27, the subject matter of any one or more of Examples 22-26 optionally include wherein the CNN is trained on a set of training images, the respective training images labelled with an illumination color cast of the image, and wherein the training minimizes a loss function, the loss function defined as an angular error between an estimated color cast and the labelled illumination color cast.

In Example 28, the subject matter of any one or more of Examples 22-27 optionally include wherein the output digital image is input to an object recognition algorithm that recognizes an object in the output digital image.

What is claimed is:

1. A system comprising:
a processor;
a memory storing instructions, which when executed by the processor, causes the processor to perform operations comprising:
receiving a digital image;
applying the digital image as input to a convolutional neural network (CNN), the CNN producing a plurality of local patch estimates of color casts in the digital image and corresponding confidence values for the plurality of local patch estimates, wherein the CNN comprises a layer applying a confidence-weighted pooling operation to the plurality of local patch estimates of the color casts in the digital image and the corresponding confidence values to produce an output color cast;
regressing a function $c(R_i)$ to produce the corresponding confidence values of the plurality of local patch estimates, wherein $R_i$ are a set of the plurality of local patch estimates, wherein, in the layer applying the confidence-weighted pooling, the plurality of local patch estimates are weighted by their corresponding confidence values and the weighted local patch estimates are summed to produce the output color cast; and
correcting, based on the output color cast, illumination of the color casts of the digital image to create an output digital image, wherein the CNN is trained using a set of training images, the respective training images labelled with an illumination color cast of the image, and wherein the CNN is trained by minimizing a loss function, the loss function defined as an angular error between an estimated color cast and the labelled illumination color cast.

2. The system of claim 1, wherein the CNN comprises a convolution layer, a Rectified Linear Unit layer, and a max pooling layer.

3. The system of claim 1, wherein the CNN is a seven-layer convolutional neural network.

4. The system of claim 1, wherein the output digital image is input to an object recognition algorithm that recognizes an object in the output digital image.

5. A non-transitory machine-readable medium storing instructions, which when executed by a machine, causes the machine to perform operations comprising:
receiving a digital image;
applying the digital image as input to a convolutional neural network (CNN), the CNN producing a plurality of local patch estimates of color casts in the digital image and corresponding confidence values for the plurality of local patch estimates, wherein the CNN comprises a layer applying a confidence-weighted pooling operation to the plurality of local patch estimates of the color casts in the digital image and the corresponding confidence values to produce an output color cast;
regressing a function $c(R_i)$ to produce the corresponding confidence values of the plurality of local patch estimates, wherein $R_i$ are a set of the plurality of local patch estimates, wherein, in the layer applying the confidence-weighted pooling, the plurality of local patch estimates are weighted by their corresponding confidence values and the weighted local patch estimates are summed to produce the output color cast; and
correcting, based on the output color cast, illumination of the color casts of the digital image to create an output digital image, wherein the CNN is trained using a set of training images, the respective training images labelled with an illumination color cast of the image, and wherein the CNN is trained by minimizing a loss function, the loss function defined as an angular error between an estimated color cast and the labelled illumination color cast.

6. The machine-readable medium of claim 5, wherein the CNN comprises a convolution layer, a Rectified Linear Unit layer, and a max pooling layer.

7. The machine-readable medium of claim 5, wherein the CNN is a seven-layer convolutional neural network.

8. The machine-readable medium of claim 5, wherein the output digital image is input to an object recognition algorithm that recognizes an object in the output digital image.

9. A method comprising:
receiving a digital image;
applying the digital image as input to a convolutional neural network (CNN), the CNN producing a plurality of local patch estimates of color casts in the digital image and corresponding confidence values for the plurality of local patch estimates, wherein the CNN comprises a layer applying a confidence-weighted pooling operation to the plurality of local patch estimates of the color casts in the digital image and the corresponding confidence values to produce an output color cast;
regressing a function $c(R_i)$ to produce the corresponding confidence values of the plurality of local patch estimates, wherein $R_i$ are a set of the plurality of local patch estimates, wherein, in the layer applying the confidence-weighted pooling, the plurality of local patch estimates are weighted by their corresponding confidence values and the weighted local patch estimates are summed to produce the output color cast; and
correcting, based on the output color cast, illumination of the color casts of the digital image to create an output digital image, wherein the CNN is trained using a set of training images, the respective training images labelled with an illumination color cast of the image, and wherein the CNN is trained by minimizing a loss function, the loss function defined as an angular error between an estimated color cast and the labelled illumination color cast.

10. The method of claim 9, wherein the CNN comprises a convolution layer, a Rectified Linear Unit layer, and a max pooling layer.

11. The method of claim 9, wherein the CNN is a seven-layer convolutional neural network.

* * * * *